United States Patent
Kawai et al.

(10) Patent No.: US 9,242,618 B2
(45) Date of Patent: Jan. 26, 2016

(54) WIRELESS COMMUNICATION SYSTEM FOR COMMUNICATION AND DISPLAYING VEHICLE INFORMATION ON A PORTABLE DEVICE

(71) Applicant: KABUSHIKI KAISHA TOKAI RIKA DENKI SEISAKUSHO, Aichi (JP)

(72) Inventors: Hideki Kawai, Aichi (JP); Hiroaki Kojima, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 250 days.

(21) Appl. No.: 13/666,421

(22) Filed: Nov. 1, 2012

(65) Prior Publication Data
US 2013/0116860 A1    May 9, 2013

(30) Foreign Application Priority Data
Nov. 7, 2011  (JP) .................. 2011-243707

(51) Int. Cl.
G07C 5/00       (2006.01)
G07C 9/00       (2006.01)
B60R 25/10      (2013.01)
G08C 19/00      (2006.01)
B60R 25/24      (2013.01)

(52) U.S. Cl.
CPC .......... *B60R 25/24* (2013.01); *G07C 5/008* (2013.01); *G07C 9/00309* (2013.01); *G07C 9/00182* (2013.01); *G07C 2009/00261* (2013.01); *G07C 2009/00507* (2013.01); *G07C 2009/00515* (2013.01); *G07C 2009/00587* (2013.01); *G07C 2009/00952* (2013.01); *G07C 2009/00984* (2013.01); *G07C 2009/00992* (2013.01); *G08C 2201/93* (2013.01)

(58) Field of Classification Search
None
See application file for complete search history.

(56) References Cited

U.S. PATENT DOCUMENTS 5,583,491 A * 12/1996 Kim .................... 340/13.31
5,850,188 A * 12/1998 Doyle et al. ........... 340/539.24
(Continued)

FOREIGN PATENT DOCUMENTS

CN      201508581     6/2010
DE      10141190      4/2003
(Continued)

OTHER PUBLICATIONS

Search report from E.P.O., mail date is Feb. 22, 2013.
(Continued)

*Primary Examiner* — Fadey Jabr
*Assistant Examiner* — Kevin P Mahne
(74) *Attorney, Agent, or Firm* — Greenblum & Bernstein, P.L.C.

(57) ABSTRACT

A wireless communication system including a portable device and a vehicle device configured to transmit information including a vehicle state. The portable device includes a telecommunication unit that obtains, through an information network, information including procedures that should be taken in accordance with the vehicle state or state of the portable device, a display, and a control unit that shows on the display the vehicle state based on the information transmitted from the vehicle device or the state of the portable device based on information of the portable device. When a measure should be taken in accordance with the vehicle state or the state of the portable device, the control unit shows on the display the procedures included in the information obtained by telecommunication unit.

3 Claims, 4 Drawing Sheets

(56) References Cited

U.S. PATENT DOCUMENTS

| | | | |
|---|---|---|---|
| 6,055,468 A * | 4/2000 | Kaman et al. | 701/99 |
| 6,862,443 B2 * | 3/2005 | Witte | 455/345 |
| 6,917,801 B2 * | 7/2005 | Witte et al. | 455/418 |
| 8,645,014 B1 * | 2/2014 | Kozlowski et al. | 701/24 |
| 8,836,477 B2 | 9/2014 | Hiramine | |
| 2003/0036832 A1 * | 2/2003 | Kokes et al. | 701/33 |
| 2003/0052648 A1 * | 3/2003 | Hara et al. | 320/132 |
| 2004/0049329 A1 * | 3/2004 | Yamamoto et al. | 701/29 |
| 2004/0133317 A1 * | 7/2004 | Hayakawa et al. | 701/29 |
| 2005/0176482 A1 * | 8/2005 | Raisinghani et al. | 455/575.9 |
| 2006/0049915 A1 * | 3/2006 | Deniau et al. | 340/5.72 |
| 2006/0142910 A1 * | 6/2006 | Grier et al. | 701/29 |
| 2007/0299575 A1 * | 12/2007 | Yamada et al. | 701/29 |
| 2008/0218373 A1 * | 9/2008 | Lanigan et al. | 340/825 |
| 2008/0246586 A1 | 10/2008 | Hiramine | |
| 2009/0021385 A1 * | 1/2009 | Kelty et al. | 340/660 |
| 2009/0096573 A1 | 4/2009 | Graessley | |
| 2010/0013596 A1 * | 1/2010 | Kakiwaki | 340/5.64 |
| 2010/0090799 A1 * | 4/2010 | Lehomme | 340/5.61 |
| 2010/0220857 A1 * | 9/2010 | Kawamura et al. | 380/44 |
| 2011/0257817 A1 * | 10/2011 | Tieman | 701/2 |
| 2011/0287733 A1 * | 11/2011 | Cepuran et al. | 455/404.1 |
| 2012/0271503 A1 * | 10/2012 | Owens et al. | 701/29.1 |
| 2012/0303182 A1 * | 11/2012 | Choi | 701/2 |
| 2013/0116860 A1 * | 5/2013 | Kawai et al. | 701/2 |
| 2014/0097937 A1 * | 4/2014 | Gercekci | 340/5.61 |
| 2014/0121890 A1 * | 5/2014 | Gercekci | 701/33.2 |

FOREIGN PATENT DOCUMENTS

| | | |
|---|---|---|
| JP | 2005-9200 | 1/2005 |
| JP | 2006-4035 | 1/2006 |
| JP | 2008-255702 | 10/2008 |
| WO | 2008124795 | 10/2008 |
| WO | 2011/147893 | 12/2011 |

OTHER PUBLICATIONS

Japanese Official Action for JP2011-243707 dated Apr. 7, 2015.
Chinese Office Action for CN201210473175.5 dated Dec. 1, 2014.

* cited by examiner

WIRELESS COMMUNICATION SYSTEM FOR COMMUNICATION AND DISPLAYING VEHICLE INFORMATION ON A PORTABLE DEVICE

CROSS-REFERENCE TO RELATED APPLICATIONS

This application is based upon and claims the benefit of priority from prior Japanese Patent Application No. 2011-243707, filed on Nov. 7, 2011, the entire contents of which are incorporated herein by reference.

BACKGROUND ART

The present invention relates to a wireless communication system.

One type of a wireless communication system known in the prior art is an electronic key system that performs wireless communication between a vehicle and an electronic key to permit the locking and unlocking of a vehicle door and the starting of the engine.

Various improvements have been made to further develop the electronic key system. For example, Japanese Laid-Open Patent Publication No. 2005-9200 describes an electric key system in which a vehicle transmits an information signal, which includes vehicle information such as a battery level or fuel level, to an electronic key through wireless communication. When the electronic key receives the information signal from the vehicle, the electronic key recognizes the vehicle information from the signal and shows the recognized vehicle information on a display of the electronic key. This allows the user to obtain vehicle information from a location remote from the vehicle.

In the electronic key system described in Japanese Laid-Open Patent Publication No. 2005-9200, the vehicle information is transmitted on a wireless signal. Thus, the amount of vehicle information that can be transmitted on the wireless signal is limited. For example, an information signal including information on the level of the vehicle battery can be transmitted through wireless communication. However, it is difficult to transmit, through wireless communication, an information signal indicating the procedures that should be taken when the vehicle battery is drained. To resolve this problem, the procedures can be stored beforehand in a memory of the electronic key and shown when necessary. In this case, however, the electronic key would require a display and a memory having a large storage capacity. This would adversely affect the portability of the electronic key and is thus not preferred. Further, the same applies when the electronic key shows the procedures that should be taken in accordance with the state of the electronic key, such as when the battery of the electronic key is drained.

SUMMARY OF THE INVENTION

One aspect of the present invention is a wireless communication system including a portable device and a vehicle device, which is configured to transmit information including a vehicle state. The portable device and the vehicle device are configured so that bidirectional communication can be performed with each other. The portable device includes a telecommunication unit, a display, and a control unit. The telecommunication unit obtains, through an information network, information including procedures that should be taken in accordance with the vehicle state or state of the portable device. The control unit shows on the display the vehicle state based on the information transmitted from the vehicle device or the state of the portable device based on information of the portable device. When a measure should be taken in accordance with the vehicle state or the state of the portable device, the control unit shows on the display the procedures included in the information obtained by the telecommunication unit.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

First Embodiment

A wireless communication system according to a first embodiment of the present invention will now be described with reference to FIGS. 1 to 3. The wireless communication system is applied to an electronic key system for a vehicle.

Figure 1:
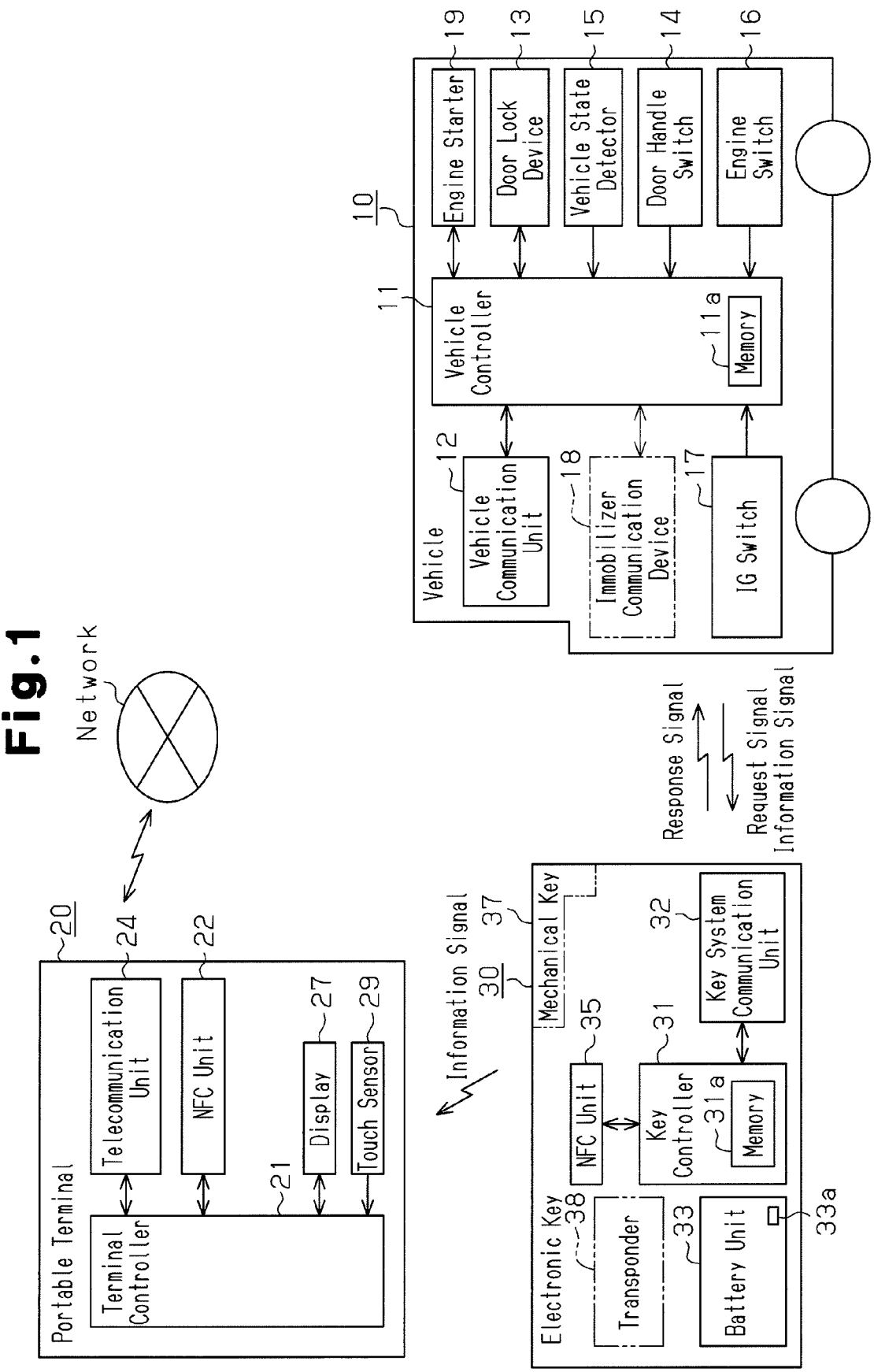
FIG. 1 is a block diagram showing the structure of an electronic key system according to a first embodiment of the present invention.
Figure 2:
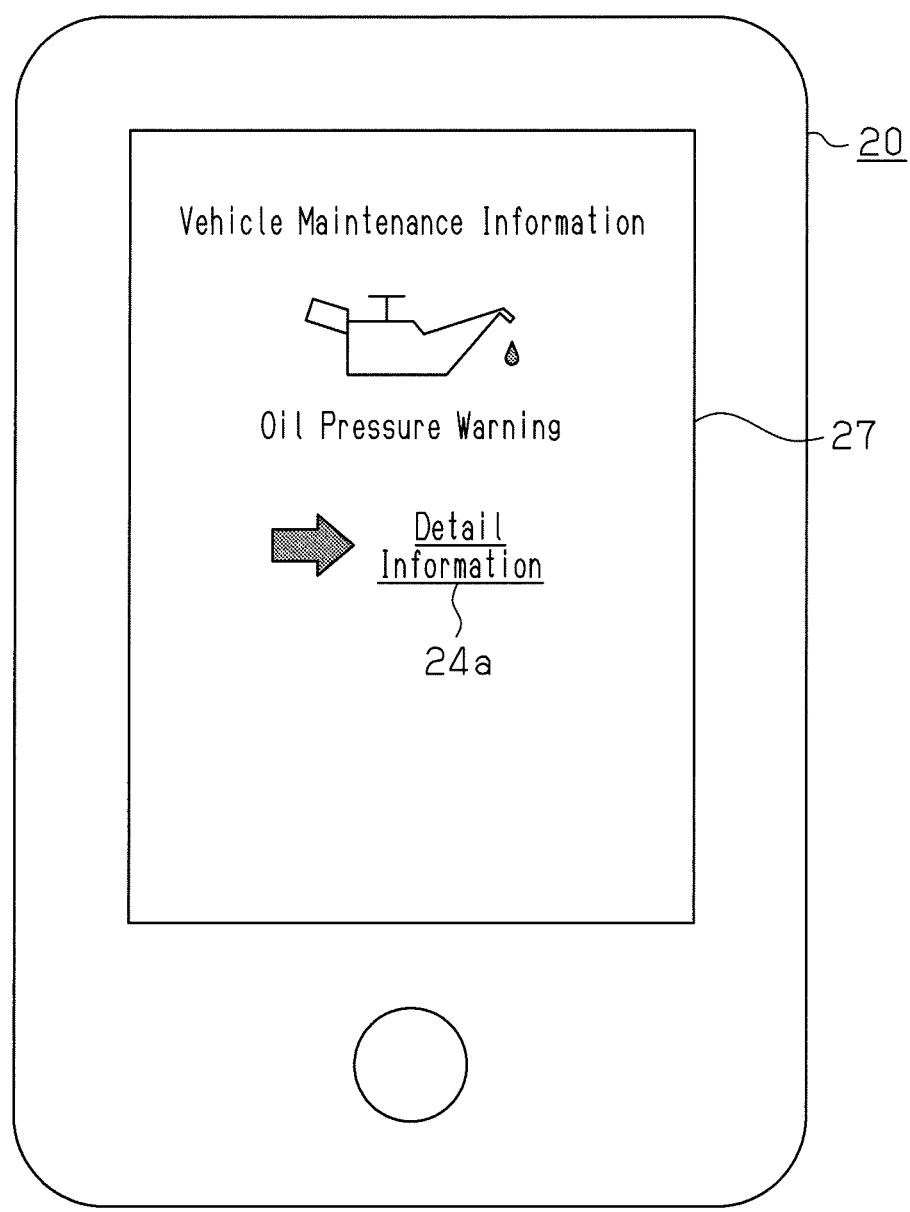
FIG. 2 is a front view showing a display of a portable terminal of the first embodiment.

As shown in FIG. 1, the electronic key system includes a vehicle 10, a portable terminal 20, and an electronic key 30.

The portable terminal 20 is a cellular phone having a function for communicating with an information network (e.g., the Internet) and may be the so-called smart phone. The electronic key 30 performs wireless communication with the vehicle 10 and permits for the locking and unlocking of a vehicle door. The vehicle 10, portable terminal 20, and electronic key 30 will now be described in detail.

<Vehicle>

The vehicle 10 includes a vehicle controller 11, a vehicle communication unit 12, a door lock device 13, a door handle switch 14, a vehicle state detector 15, an ignition (IG) switch 17, an engine starter 19, and an engine switch 16.

The vehicle controller 11 controls the vehicle 10 and includes a nonvolatile memory 11a. The memory 11a stores an ID code unique to the electronic key 30 that is registered to the vehicle 10.

The door handle switch 14 is arranged on a door handle of the vehicle door outside the vehicle 10. When pushed by the user, the door handle switch 14 provides the vehicle controller 11 with an operation signal indicating that the door handle switch 14 has been pushed.

The engine switch 16, which is arranged near to the driver seat, is pushed when starting the engine. When pushed, the engine switch 16 provides the vehicle controller 11 with an operation signal indicating that the engine switch 16 has been pushed.

When the engine is not running and stopped, the vehicle controller 11 generates, in fixed cycles, a request signal that requests for a response from the electronic key 30. Then, the vehicle controller 11 provides the vehicle communication unit 12 with the generated signal. The vehicle communication unit 12 modulates the request signal from the vehicle controller 11 to a signal carried on the low frequency (LF) band and transmits the modulated request signal to the proximal surrounding and interior of the vehicle 10.

In response to the request signal, the electronic key 30, which is located in the proximal surrounding of the vehicle 10, transmits a response signal. When the vehicle communication unit 12 receives the response signal, the vehicle communication unit 12 demodulates the response signal and provides the demodulated response signal to the vehicle controller 11. When the vehicle controller 11 recognizes the response signal, the vehicle controller 11 verifies an ID code that is included in the response signal with the ID code stored in the memory 11a. When the vehicle controller 11 determines that the ID code of the response signal conforms to the ID code stored in the memory 11a, the vehicle controller 11 permits the locking and unlocking of the vehicle door. When the vehicle controller 11 permits door locking and unlocking and receives an operation signal indicating that the door handle switch 14 has been operated, the vehicle controller 11 switches the vehicle door between a locked state and an unlocked state with the door lock device 13.

When the vehicle controller 11 transmits a request signal to the interior of the vehicle 10 and determines that an ID code included in a response signal from the electronic key 30, which is located in the interior of the vehicle 10, conforms to the ID code stored in the memory 11a in the same manner as described above, the vehicle controller 11 permits the starting of the engine. When the vehicle controller 11 permits the starting of the engine and determines that the engine switch 16 has been pushed, the vehicle controller 11 starts the engine with the engine starter 19.

The IG switch 17 detects the ignition state of the vehicle 10 and provides the detection result to the vehicle controller 11. Based on the detection result of the IG switch 17, the vehicle controller 11 recognizes the ignition state of the vehicle 10.

The vehicle state detector 15 detects the vehicle state, which is generally shown on the instrument panel, and provides the detection result to the vehicle controller 11. The vehicle state may include, for example, the gasoline level, the voltage of the vehicle battery, hydraulic pressure, the locking and unlocking of the vehicle door, the opening and closing of the vehicle door, the engine temperature, and the state of an anti-lock brake system (ABS). Based on the detection result from the vehicle state detector 15, the vehicle controller 11 recognizes the vehicle state, which may be any one of those exemplified above.

When the vehicle controller 11 determines with the IG switch 17 that the ignition state of the vehicle 10 has been switched to a deactivated state, the vehicle controller 11 generates an information signal including the detection result (vehicle state) of the vehicle state detector 15 and provides the vehicle communication unit 12 with the information signal. The vehicle communication unit 12 modulates the information signal from the vehicle controller 11 to an LF band signal and transmits the modulated information signal to the interior of the vehicle 10. The vehicle state included in the information signal can be changed as required. The vehicle controller 11 corresponds to a vehicle device.

<Electronic Key>

The electronic key 30 includes a key controller 31, a near field communication (NFC) unit 35, a key system communication unit 32, and a battery unit 33.

The battery unit 33 supplies each unit of the electronic key 30 with power. The key controller 31 controls the electronic key 30 and includes a nonvolatile memory 31a. The memory 31a stores the ID code that is unique to the electronic key 30.

When the key system communication unit 32 receives a request signal, the key system communication unit 32 demodulates the request signal and provides the demodulated request signal to the key controller 31. When the key controller 31 recognizes the request signal, the key controller 31 generates a response signal that includes the ID code stored in the memory 31a. Then, the key controller 31 provides the key system communication unit 32 with the generated signal. The key system communication unit 32 modulates the response signal to a signal carried on the ultrahigh frequency (UHF) and transmits the modulated response signal to the vehicle 10 through wireless communication.

In the same manner as the request signal, the key controller 31 receives and demodulates an information signal with the key system communication unit 32. When the key controller 31 recognizes an information signal, the key controller 31 stores the vehicle state, which is included in the signal, in the memory 31a.

The portable terminal 20 and the electronic key 30 are configured so that they can perform near field communication (NFC) with each other. The portable terminal 20 and the electronic key 30 are paired with each other in advance.

Based on a user operation, the portable terminal 20 transmits a communication request signal to its proximal surrounding over a fixed period. When the portable terminal 20 is transmitting a communication request signal and held in the vicinity of the electronic key 30, the NFC unit 35 of the electronic key 30 receives the communication request signal. The NFC unit 35 demodulates the communication request signal and provides the key controller 31 with the demodulated communication request signal. When the key controller 31 recognizes the communication request signal, the key controller 31 generates a connection request signal and provides the NFC unit 35 with the connection request signal. The NFC unit 35 modulates the connection request signal and transmits the modulated signal to the portable terminal 20 through wireless communication. In response to the connection request signal, the portable terminal 20 transmits a connection response signal through wireless communication. In the same manner as described above, the key controller 31 receives and demodulates the connection response signal with the NFC unit 35. When the key controller 31 determines that the received signal is a connection response signal, the key controller 31 determines that near field communication has been established with the portable terminal 20.

When the key controller 31 determines that near field communication has been established with the portable terminal 20, the key controller 31 generates an information signal that includes the vehicle state stored in the memory 31a. Then, the key controller 31 provides the generated signal to the NFC unit 35. The NFC unit 35 modulates the information signal and transmits the modulated signal to the portable terminal 20 through wireless communication.

<Portable Terminal>

The portable terminal 20 includes a terminal controller 21, an NFC unit 22, a telecommunication unit 24, a display 27, and a touch sensor 29.

The terminal controller 21 controls the portable terminal 20. The touch sensor 29 detects touching of the display 27, or a touch operation, and provides the terminal controller 21 with the detection result. The terminal controller 21 determines that the display 27 has been touched based on the detection result of the touch sensor 29.

In accordance with the touch operation, the terminal controller 21 performs a call, sends and receives electronic mails, and connects to an information network (e.g., the Internet) with the telecommunication unit 24.

Based on a touch operation, the terminal controller 21 transmits a communication request signal with the NFC unit 22 through wireless communication. In response to the communication request signal, the electronic key 30 transmits a connection request signal. The NFC unit 22 receives and demodulates the connection request signal and provides the terminal controller 21 with the demodulated signal. When the terminal controller 21 recognizes the connection request signal, the terminal controller 21 determines that near field communication has been established with the electronic key 30 and transmits a connection response signal with the NFC unit 22 through wireless communication.

In a state in which near field communication is established between the terminal controller 21 and the electronic key 30, when the terminal controller 21 receives an information signal from the electronic key 30, the terminal controller 21 shows the vehicle state, which is included in the signal, on the display 27. For example, as shown in FIG. 2, the terminal controller 21 shows on the display 27 with icons and characters that the pressure of the lubrication oil in the engine is low. Here, the terminal controller 21 provides a link 24*a* shown as "detail information" on the display 27. The link 24*a* designates a uniform resource location (URL) corresponding to a certain webpage. The webpage shows the procedures that should be taken when the oil pressure is low and is included in a vehicle manual disclosed on the Internet by a vehicle manufacturer. Accordingly, when the terminal controller 21 determines with the touch sensor 29 that the link 24*a* has been touched and selected, the terminal controller 21 uses the Internet to show the procedures that should be taken when the oil pressure is low. This allows for the user to properly cope with the low oil pressure.

The link 24*a* is set to designate different URLs depending on the vehicle state. For example, in a vehicle state in which the voltage of the vehicle battery is low, the procedures for replacement of the vehicle battery or for charging the vehicle battery can be accessed with the link 24*a*.

When the terminal controller 21 determines that the information signal indicates a normal vehicle state (normal oil pressure and normal battery voltage), the terminal controller 21 shows a message indicating such a state on the display 27. In this case, the link 24*a* is not shown on the display 27. The terminal controller 21 corresponds to a control unit.

The operation sequence of the vehicle 10 (vehicle controller 11), the electronic key 30 (key controller 31), and the portable terminal 20 (terminal controller 21) will now be described with reference to FIG. 3.

When the vehicle controller 11 determines that the ignition state of the vehicle 10 is in the deactivated state (S101), the vehicle controller 11 transmits an information signal that includes information of the vehicle state (S102).

When the key controller 31 receives the information signal, the key controller 31 stores the vehicle state, which is included in the signal, in the memory 31*a* (S103).

When the portable terminal 20 is transmitting a communication request signal and held in the vicinity of the electronic key 30, communication is established between the electronic key 30 and the portable terminal 20 (S104, S105). Then, the key controller 31 transmits an information signal, which includes the information of the vehicle state stored in the memory 31*a*, to the portable terminal 20 (S106).

When the terminal controller 21 receives the information signal, the terminal controller 21 shows on the display 27 the vehicle state, which is included in the signal, and the link 24*a*, which is for accessing the procedures for coping with the vehicle state (S107). When the terminal controller 21 determines that the link 24*a* on the display 27 has been touched and selected (S108), the terminal controller 21 uses the information network to show the procedures for coping with the vehicle state on the display 27 (S109). This completes the processing performed by the vehicle controller 11, the key controller 31, and the terminal controller 21.

The above embodiment has the following advantages.

(1) The electronic key 30 and the portable terminal 20 are configured so that they can perform near field communication. When the electronic key 30 receives an information signal from the vehicle 10, the electronic key 30 stores the vehicle state included in the information signal. Then, when the electronic key 30 is held in the vicinity of the portable terminal 20, communication is established between the electronic key 30 and the portable terminal 20. When communication is established between the electronic key 30 and the portable terminal 20, the electronic key 30 transmits the information signal including the stored vehicle state to the portable terminal 20. When the portable terminal 20 receives the information signal, the portable terminal 20 shows the vehicle state included in the signal on the display 27. Further, the portable terminal 20 shows the link 24*a* on the display 27. When determining that the link 24*a* has been touched and selected, the portable terminal 20 shows the procedures for coping with the vehicle state obtained through the information network on the display 27. In this manner, the procedures for coping with the vehicle state are obtained through the information network. Thus, there is no need to store a vast amount of information related to the procedures in the electronic key 30 beforehand. As a result, the user can be informed of the detailed procedures without adversely affecting the portability of the electronic key 30. This allows for the user to properly cope with the vehicle state by referring to the procedures shown on the display 27.

Even when the user is separated from the vehicle 10, by holding the electronic key 30 in the vicinity of the portable terminal 20, the user can recognize the vehicle state (especially, vehicle abnormality) that is shown on the display 27 of the portable terminal 20.

Further, the user can view the display 27 of the portable terminal 20 to refer to the procedures described in a manual. Thus, the user does not have to retrieve the manual from, for example, the glove compartment of the vehicle 10 or search the manual for the contents of the vehicle state and the procedures for coping with the vehicle state.

(2) The portable terminal 20 shows the vehicle state together with the link 24*a* to the information of the procedures for coping with the vehicle state. When determining that the link 24*a* has been touched and selected, the portable terminal 20 obtains the procedures through the information network and shows the obtained procedures on the display 27. In this manner, the procedures are shown on the portable terminal 20 only when necessary. Thus, the portable terminal 20 does not obtain unnecessary information through the information network.

(3) The portable terminal 20 includes the telecommunication unit 24, which is used for communication with the information network, and the display 27, which shows the information obtained through the information network. Thus, there is no need to add a telecommunication unit and a display to the electronic key 30. Accordingly, the conventional electronic key 30 and portable terminal 20 can be used to inform the user of how to cope with certain vehicle states as described above.

Second Embodiment

A second embodiment of the present invention will now be described with reference to FIG. 4. The electronic key system of the present embodiment differs from the first embodiment in that the portable terminal can show the procedures for coping with battery drainage of the electronic key. The electronic key system has substantially the same structure as the electronic key system of the first embodiment shown in FIG. 1. The electronic key system of the second embodiment will now be described centering on the differences from the first embodiment.

As indicated by the double-dashed line in FIG. 1, the electronic key 30 includes a mechanical key 37 and a transponder 38. When the battery of the electronic key 30 is drained, the mechanical key 37 can be used to mechanically lock and unlock the vehicle door. More specifically, the user removes the mechanical key 37 from the electronic key 30. The user then inserts the mechanical key 37 into a key cylinder in the vehicle door and turns the mechanical key 37. This locks or unlocks the vehicle door.

Further, the transponder 38 permits the starting of the engine when the battery of the electronic key 30 is drained and includes a coil and an IC chip. When the transponder 38 receives drive radio waves locally transmitted to the vicinity of the engine switch 16, induced electromotive force is generated at the coil of the transponder 38. The transponder 38 uses the induced electromotive force to transmit a transponder response signal that includes an ID code of the transponder 38. Here, the power of the battery unit 33 is not used.

As shown by the double-dashed line in FIG. 1, the vehicle 10 includes an immobilizer communication device 18. For example, when the engine is stopped and the brake pedal is depressed, the vehicle controller 11 provides the immobilizer communication device 18 with a command signal. In response to the command signal, the immobilizer communication device 18 transmits drive radio waves to the vicinity of the engine switch 16. When the electronic key 30 is held in the vicinity of the engine switch 16, the transponder 38 of the electronic key 30 receives the drive radio waves and transmits a transponder response signal, which includes the ID code. When the immobilizer communication device 18 receives the transponder response signal, the immobilizer communication device 18 demodulates the signal and provides the vehicle controller 11 with the demodulated signal. The vehicle controller 11 verifies the ID code that is included in the transponder response signal with an ID code that is stored in the memory 11a (transponder verification). In a state in which the transponder verification is accomplished, that is, the ID code included in the transponder response signal conforms to the transponder response signal, when the vehicle controller 11 determines that the engine switch 16 has been pushed, the vehicle controller 11 starts the engine with the engine starter 19.

The battery unit 33 includes a voltage detector 33a. When the voltage detector 33a detects the battery voltage, the voltage detector 33a provides the key controller 31 with the detection result. The battery voltage has a value that corresponds to the battery level.

The key controller 31 transmits an information signal that includes the battery voltage detected by the voltage detector 33a. The information signal corresponds to the information signal transmitted in step S106 of FIG. 3 in the first embodiment.

Figure 4:
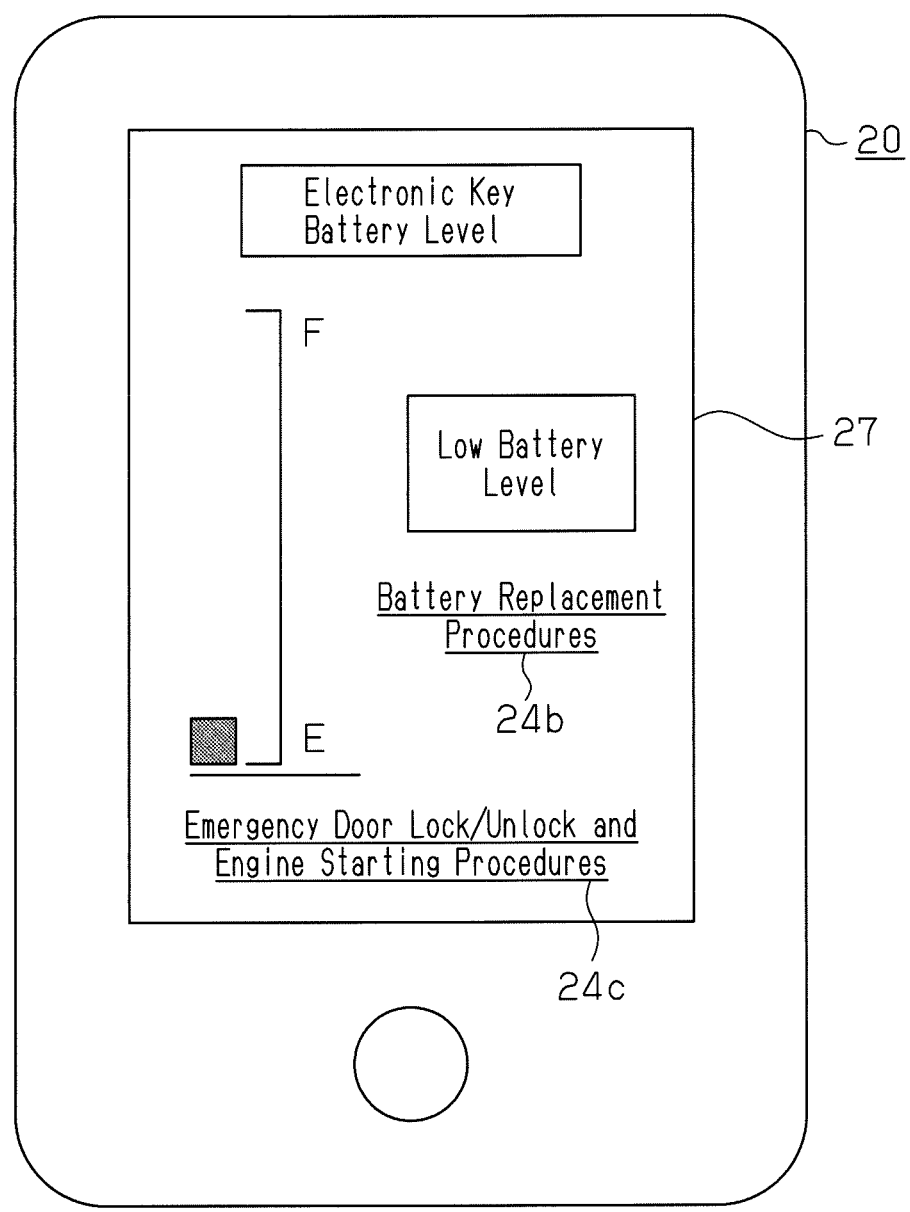
FIG. 4 is a front view showing a display of a portable terminal according to a second embodiment of the present invention.

As shown in FIG. 4, the terminal controller 21 shows the battery voltage, which is included in the received information signal, on the display 27. When the battery voltage is less than or equal to a first threshold, the terminal controller 21 determines that the voltage level of the battery is low and that communication between the electronic key 30 and the vehicle 10 will soon become difficult. Thus, the terminal controller 21 provides a link 24b shown as "battery replacement procedures" on the display 27. The link 24a can be touched and selected on the display 27.

When the terminal controller 21 determines with the touch sensor 29 that the link 24b has been touched and selected, the terminal controller 21 uses the Internet to show the procedures for replacing the battery on the display 27. The battery replacement procedures are included in a vehicle manual disclosed on the Internet. This allows for the user to properly replace the battery of the electronic key 30 in accordance with the procedures.

When the battery voltage is less than or equal to a second threshold, the terminal controller 21 provides a link 24c shown as "emergency lock/unlock and engine starting procedures". The second threshold is lower than the first threshold.

When the terminal controller 21 determines with the touch sensor 29 that the link 24c has been touched and selected, the terminal controller 21 uses the Internet to show the procedures for locking and unlocking the vehicle door and starting the engine when the battery of the electronic key 30 is drained. The procedures are included in the vehicle manner disclosed on the Internet. This allows for the user to lock and unlock the vehicle door with the mechanical key 37 or start the engine with the transponder 38.

In addition to advantages (1) to (3) of the first embodiment, the above embodiment has the advantages described below.

(4) When communication is established between the electronic key 30 and the portable terminal 20, the electronic key 30 transmits an information signal including information of the battery voltage. When the portable terminal 20 receives the information signal, the portable terminal 20 shows the battery voltage information (battery level) on the display 27. When the portable terminal 20 determines that the battery voltage is less than or equal to the first threshold voltage, the portable terminal 20 provides the link 24b that is used to show the procedures for replacing the battery of the electronic key 30. Further, when the portable terminal 20 determines that the battery voltage is less than or equal to the second threshold voltage, the portable terminal 20 provides the link 24c that is used to show the procedures for locking and unlocking the vehicle door and starting the engine when the battery of the electronic key 30 is drained. When the links 24b and 24c are touched and selected, the procedures for coping with each corresponding situation is shown in the display 27. The user can lock and unlock the vehicle door or start the engine without replacing the battery or without using the battery power of the electronic key 30 by referring to the procedures shown on the display 27.

(5) The battery level of the electronic key 30 can be shown on the portable terminal 20 by holding the electronic key 30 in the vicinity of the portable terminal 20 and establishing communication between the electronic key 30 and the portable terminal 20. This allows the user to easily check the battery level of the electronic key 30.

In particular, when the electronic key 30 cannot be used to lock or unlock the vehicle door or to start the engine, the user can recognize that this is due to battery drainage by checking the battery level shown on the portable terminal 20.

It should be apparent to those skilled in the art that the present invention may be embodied in many other specific forms without departing from the spirit or scope of the invention. Particularly, it should be understood that the present invention may be embodied in the following forms.

In the first and second embodiments, the electronic key 30 and the portable terminal 20 are independent from each other. However, the portable terminal 20 may include the function of an electronic key. When the portable terminal 20 that has the electronic key function is applied to the first embodiment, wireless communication between the electronic key 30 and the portable terminal 20 is unnecessary. Accordingly, the processes of steps S104 to S106 in FIG. 6 can be eliminated. When the portable terminal 20 that has the electronic key function is applied to the second embodiment, the transfer of the information related to the battery voltage between the electronic key 30 and the portable terminal 20 becomes unnecessary. More specifically, as the battery voltage of the portable device (portable terminal 20 having an electronic key function) decreases, the portable device shows the link on the display 27.

The procedures shown on the display 27 in the first and second embodiments are mere examples. For instance, the contact information for road service or a car dealer may be shown.

In the first and second embodiments, the information related to the vehicle state or the battery voltage of the electronic key 30 may be sent through an electronic mail or the like from the portable terminal 20 to the car dealer. This allows the car dealer that receives the information of the vehicle state or the like to prepare for a part replacement at an early stage, for example.

Figure 3:
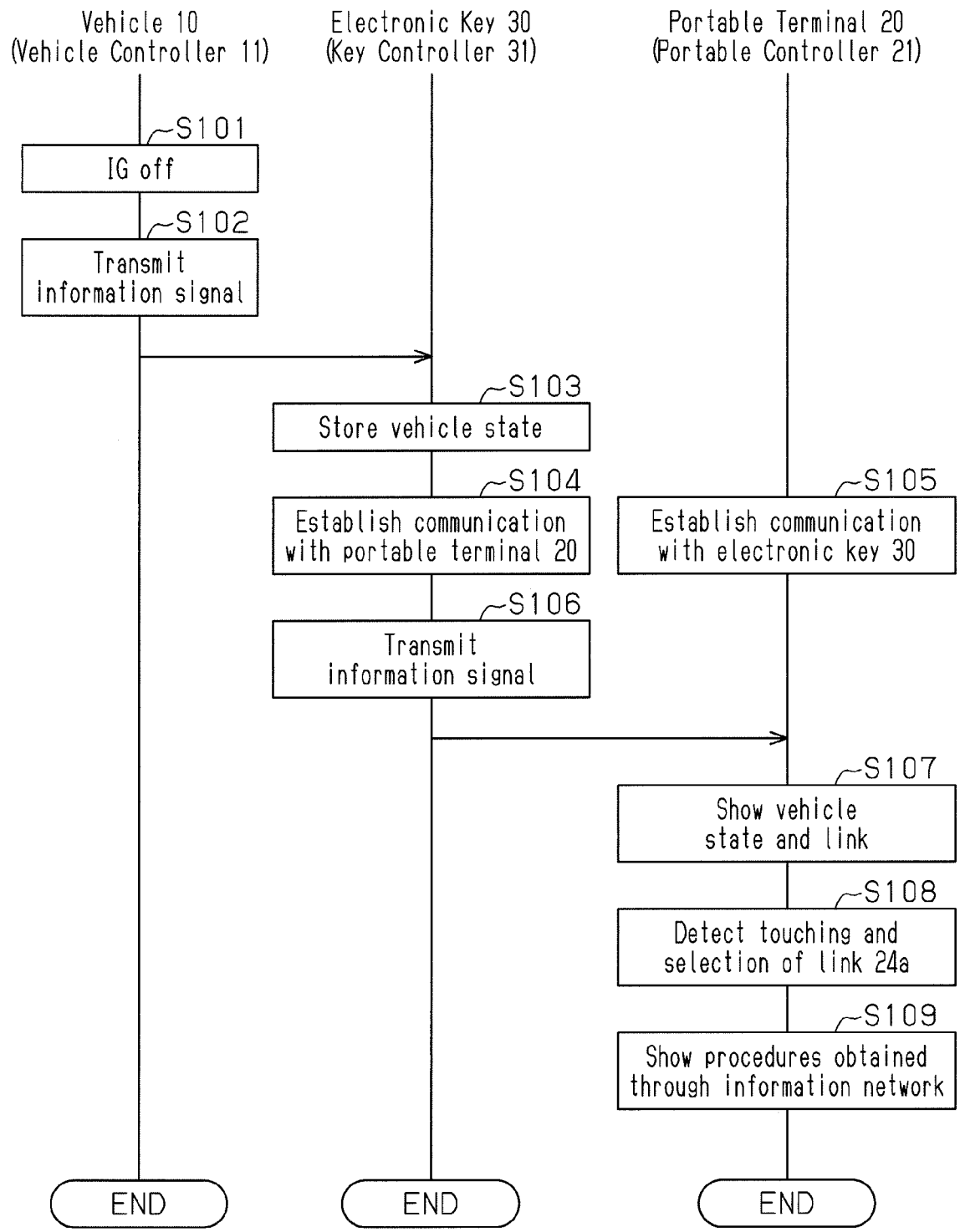
FIG. 3 is a sequence chart showing the operation of the a vehicle, electronic key, and portable terminal in the first embodiment.

In the first embodiment, when the key controller 31 stores the vehicle state in step S103 of FIG. 3, the present time may also be stored. This stores the vehicle state in association with time to the memory 31*a*. Further, for example, the information including the vehicle state associated with time may be shown on the display 27 of the portable terminal 20 at the car dealer. The car dealer can accurately recognize the vehicle state by checking the information shown on the display 27 and use the information for servicing. Further, the car dealer can use the information to determine whether or not the user may be responsible for a fault, for example, whether or not the user ignored a warning.

In the first and second embodiments, the portable terminal 20 is a smart phone. However, the portable terminal 20 may be a notebook computer that can perform near field communication with the electronic key 30 or perform communication with the information network.

In the first and second embodiments, the procedures shown on the display 27 are included in a vehicle manual disclosed by the vehicle maker on the Internet. However, a web page describing the procedures may be set up, and a link to the corresponding URL may be provided.

In the first and second embodiments, when recognizing the ignition state of the vehicle 10 has been switched to a deactivated state, the vehicle controller 11 transmits an information signal. However, the transmission timing of the information signal is not limited in such a manner. For example, after the ignition state of the vehicle 10 is switched to a deactivated state, when the vehicle door opens and then closes, the vehicle controller 11 determines that the user has left the vehicle 10. In this case, the vehicle controller 11 may transmit an information signal to the proximal surrounding of the vehicle 10.

When the door handle switch 14 is operated, an information signal may be transmitted if the shift lever is moved to a parking position or a parking brake (for example, hand brake) is operated.

In the first and second embodiments, the information signal and request signal are separately transmitted. However, a request signal that includes the information of the vehicle state may be transmitted. This decreases the number of times signals are transmitted.

In the second embodiment, the transmission of an information signal to show the vehicle state on the display 27 like in the first embodiment can be omitted. In this case, the transmission of the information signal from the vehicle 10 to the electronic key 30 (step S102 in FIG. 3) is omitted.

In the second embodiment, the information related to the battery voltage is added to the information signal transmitted in step S106 of FIG. 3 like in the first embodiment. However, an information signal related to the battery voltage may be independently transmitted.

In the first and second embodiments, the vehicle state or the battery voltage and the links 24*a* to 24*c* are shown on the display 27. When the links 24*a* to 24*c* are touched and selected, the corresponding procedures are shown on the display 27. However, the procedures obtained through the Internet may be shown from the beginning on the display 27 together with the vehicle state or the battery voltage.

In the second embodiment, the battery level is shown on the display 27. Instead, the state of the electronic key 30, for example, a failure in the electronic key 30, may be shown. In this case, the link 24*c* is provided on the display 27 so that the user can cope with such a situation.

In the first and second embodiments, the portable terminal 20 selects a link that is touched on the display 27. However, the portable terminal 20 may include a numerical keypad that is used to select a link.

In the second embodiment, the first and second thresholds are set. However, there may be only one threshold. In such a case, when the terminal controller 21 determines that the battery voltage has decreased to the threshold or less, the terminal controller 21 provides the two links 24*b* and 24*c*.

In the first and second embodiments, the portable terminal 20, when undergoing a touch operation performed by a user, transmits a communication request signal to the proximal surrounding. When the electronic key 30 is held in the vicinity of the portable terminal 20 that is transmitting the communication request signal, an information signal from the electronic key 30 to the portable terminal 20 can be transmitted. However, even when the user does not perform a touch operation, the portable terminal may cyclically transmit the communication request signal. This automatically establishes communication when the portable terminal 20 and the electronic key 30 are located near each other. Thus, for example, the vehicle state that is included in the information signal may be shown on a standby screen of the portable terminal 20. Further, when there is an abnormality in the vehicle state, the portable terminal 20 may show such a state. In this case, in addition to showing the abnormality on the vehicle state on the portable terminal 20, a voice or vibration may be used to inform the user of the abnormality.

Further, the electronic key 30 may transmit a communication request signal to its proximal surrounding. In this case, the transmission direction between the electronic key 30 and the portable terminal 20 for the communication request signal, the connection request signal, and the connection response signal is reversed from that of the above embodiments.

In the first and second embodiments, a link is provided in correspondence with a web page of a vehicle manual. However, a link may be provided in correspondence with a web page of a maintenance manual or a troubleshooting chart that is disclosed on the Internet.

In the second embodiment, when determining that the battery voltage is less than or equal to the second threshold, the terminal controller 21 provides the link 24c shown as "emergency lock/unlock and engine starting procedures" that can be touched and selected. However, a link for emergency locking and unlocking procedures and a link for emergency engine starting procedures may be separately provided. Alternatively, just one of these links may be provided.

In the second embodiment, the procedures for locking or unlocking the vehicle door and the procedures for starting the engine in the second embodiment that are taken when the battery of the electronic key 30 drains are just examples. For instance, the procedures for starting the engine when the battery of the electronic key 30 is drained may include the usage of the mechanical key 37 in the same manner as when locking or unlocking the vehicle door. In this case, the link 24c is touched and selected to show such procedures for starting the engine.

The present examples and embodiments are to be considered as illustrative and not restrictive, and the invention is not to be limited to the details given herein, but may be modified within the scope and equivalence of the appended claims.

What is claimed is:

1. A wireless communication system comprising:
   a portable device; and
   a vehicle communication device configured to transmit information including a vehicle state, wherein
   the portable device and the vehicle communication device are configured so that bidirectional communication can be performed with each other, wherein
   the portable device includes an electronic key and a portable terminal,
   the electronic key includes:
      a first near field communication unit that performs near field communication with the portable terminal and is configured to at least one of lock a vehicle door, unlock a vehicle door or start an engine through wireless communication with the vehicle communication device,
   the portable terminal includes:
      a telecommunication unit that obtains, through an information network, information including procedures that should be taken in accordance with at least one of a vehicle state or a state of the portable device,
      a display,
      a control unit that shows on the display at least one of the vehicle state based on the information transmitted from the vehicle communication device or the state of the portable device based on information of the portable device, and
      a second near field communication unit that performs near field communication with the first near field communication unit, wherein
      the control unit obtains information including at least one of the vehicle state or information including a state of the electronic key through the near field communication performed with the electronic key, wherein
      when a measure should be taken in accordance with at least one of the vehicle state or the state of the portable device, the control unit shows on the display the procedures included in the information obtained by the telecommunication unit,
      when near field communication with the portable terminal is established, the electronic key transmits information including a battery level of the electronic key to the portable terminal,
      when the control unit of the portable terminal receives the information including the battery level with the second near field communication unit, the control unit shows the battery level on the display,
      when the control unit of the portable terminal determines that the battery level is less than or equal to at least one of a first threshold and a second threshold, the control unit shows on the display the procedures included in the information obtained by the telecommunication unit,
      the procedures include at least one of procedures for replacing a battery of the electronic key, procedures for locking or unlocking a vehicle door when the battery of the electronic key is drained, and procedures for starting the engine when the battery of the electronic key is drained,
      when the control unit of the portable terminal determines that the battery level is less than or equal to the first threshold, the control unit shows on the display a link to the procedures for replacing the battery of the electronic key, and
      when the control unit of the portable terminal determines that the battery level is less than or equal to the second threshold that is less than the first threshold, the control unit shows on the display a link to at least one of the procedures for locking or unlocking the vehicle door when the battery of the electronic key is drained or the procedures for starting the engine when the battery of the electronic key is drained.

2. The wireless communication system according to claim 1, wherein
   when the electronic key receives the information including the vehicle state from the vehicle communication device, the electronic key stores the information including the vehicle state,
   when near field communication with the portable terminal is established, the electronic key transmits the stored information including the vehicle state to the portable terminal with the first near field communication unit,
   when the control unit of the portable terminal receives the information including the vehicle state with the second near field communication unit, the control unit shows the vehicle state on the display, and
   when a measure is required to be taken to cope with the vehicle state, the control unit of the portable terminal shows on the display the procedures corresponding to the vehicle state included in the information obtained by the telecommunication unit.

3. The wireless communication system according to claim 1, wherein
   the control unit shows the vehicle state or the state of the portable device on the display,
   the control unit provides on the display the link for accessing the information including the procedures through the information network, and
   when the control unit determines that the link has been selected, the control unit shows the procedures included in the information obtained by the telecommunication unit on the display.

* * * * *

UNITED STATES PATENT AND TRADEMARK OFFICE
CERTIFICATE OF CORRECTION

| | | |
|---|---|---|
| PATENT NO. | : 9,242,618 B2 | Page 1 of 1 |
| APPLICATION NO. | : 13/666421 | |
| DATED | : January 26, 2016 | |
| INVENTOR(S) | : Hideki Kawai et al. | |

It is certified that error appears in the above-identified patent and that said Letters Patent is hereby corrected as shown below:

On the title page, item (54) and in the specification, column 1, line 1, Title, "WIRELESS COMMUNICATION SYSTEM FOR COMMUNICATION AND DISPLAYING VEHICLE INFORMATION ON A PORTABLE DEVICE" should be --WIRELESS COMMUNICATION SYSTEM FOR COMMUNICATING AND DISPLAYING VEHICLE INFORMATION ON A PORTABLE DEVICE--

Signed and Sealed this
Seventeenth Day of May, 2016

Michelle K. Lee
*Director of the United States Patent and Trademark Office*